Oct. 28, 1958 M. F. GONSER 2,857,632
METHOD OF MAKING PANELS
Original Filed Nov. 29, 1949 5 Sheets-Sheet 1
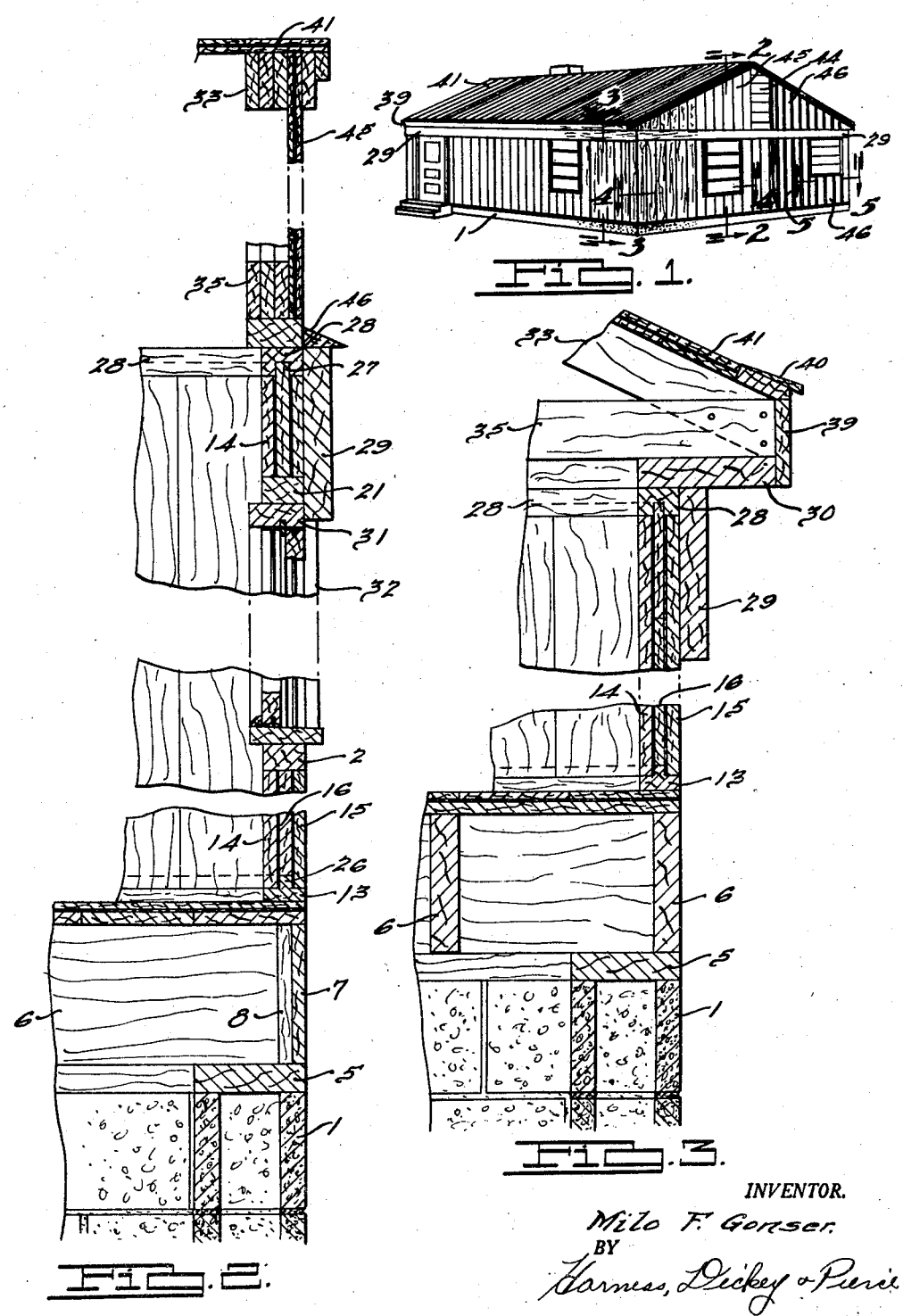
INVENTOR.
Milo F. Gonser.
BY
Harness, Dickey & Pierce.
ATTORNEYS.

Oct. 28, 1958   M. F. GONSER   2,857,632
METHOD OF MAKING PANELS
Original Filed Nov. 29, 1949   5 Sheets-Sheet 2
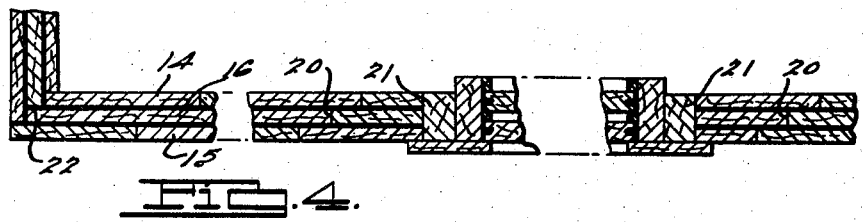
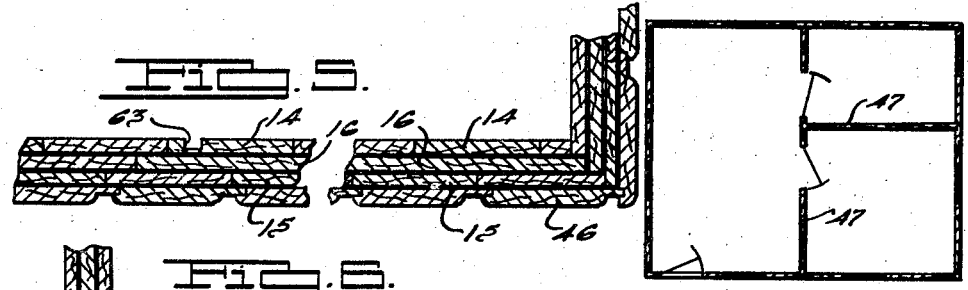
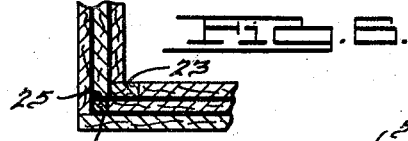
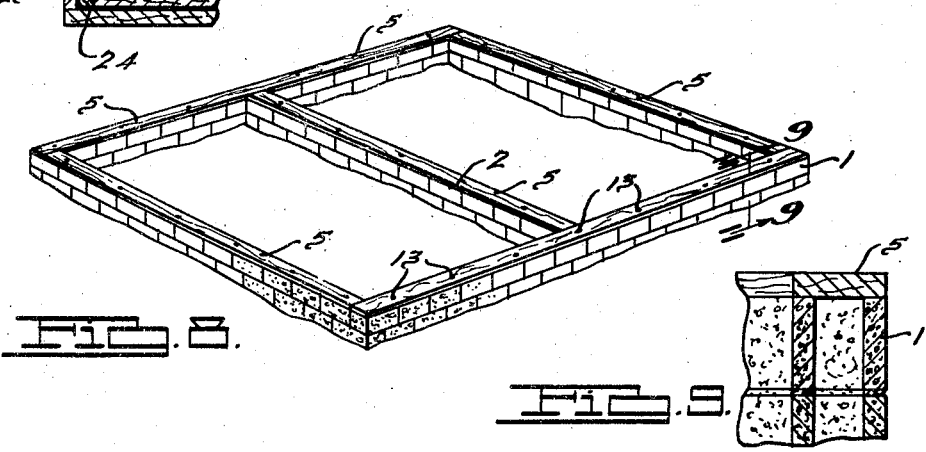
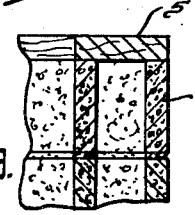
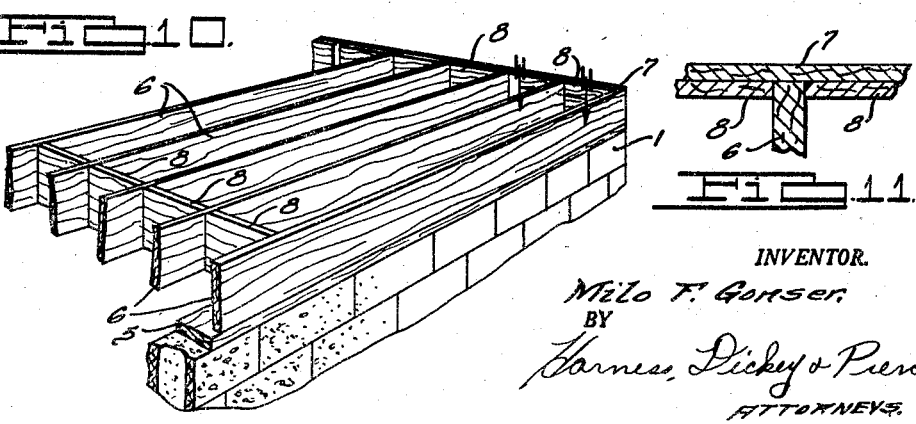
INVENTOR.
*Milo F. Gonser,*
BY
*Harness, Dickey & Pierce,*
ATTORNEYS.

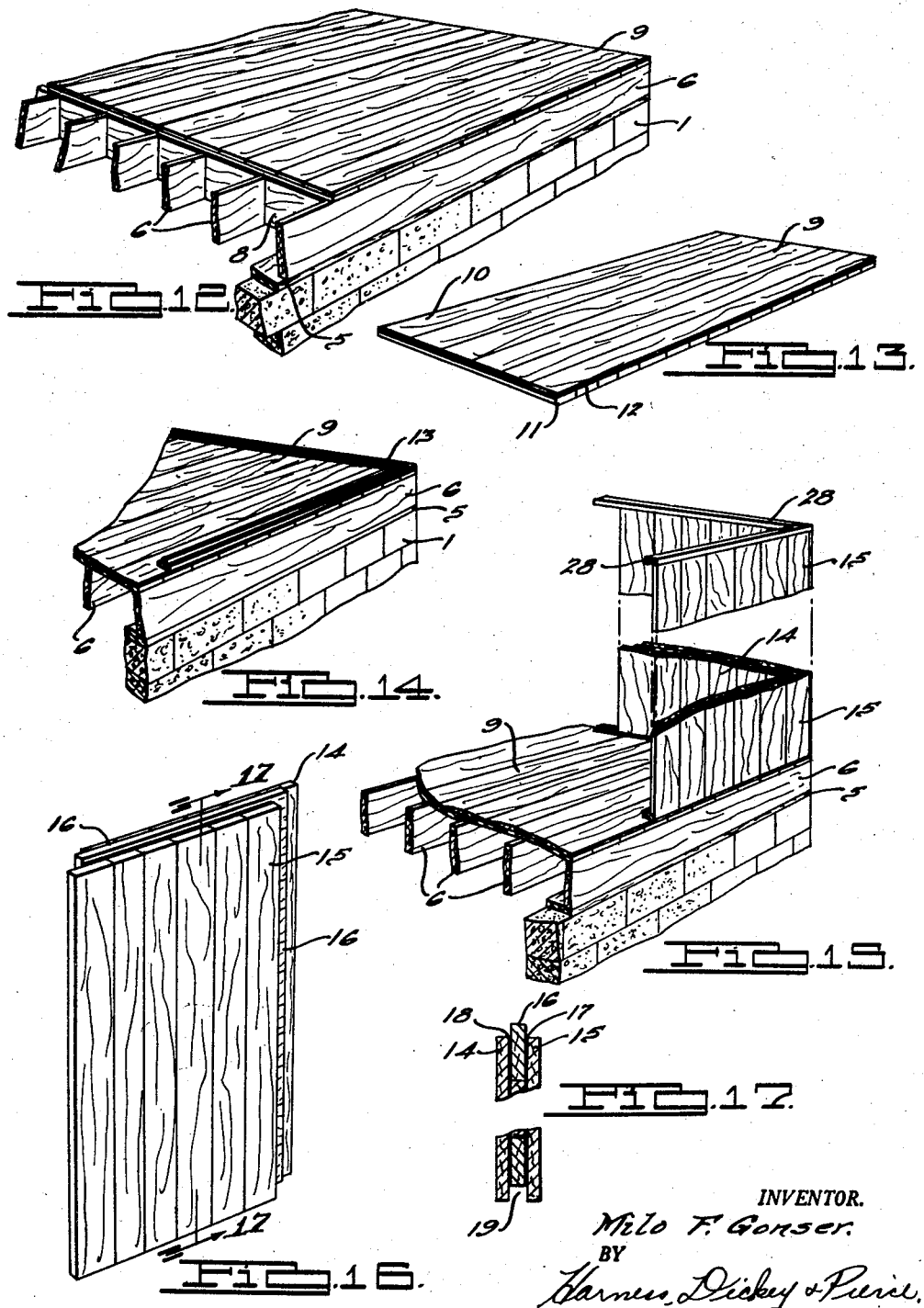

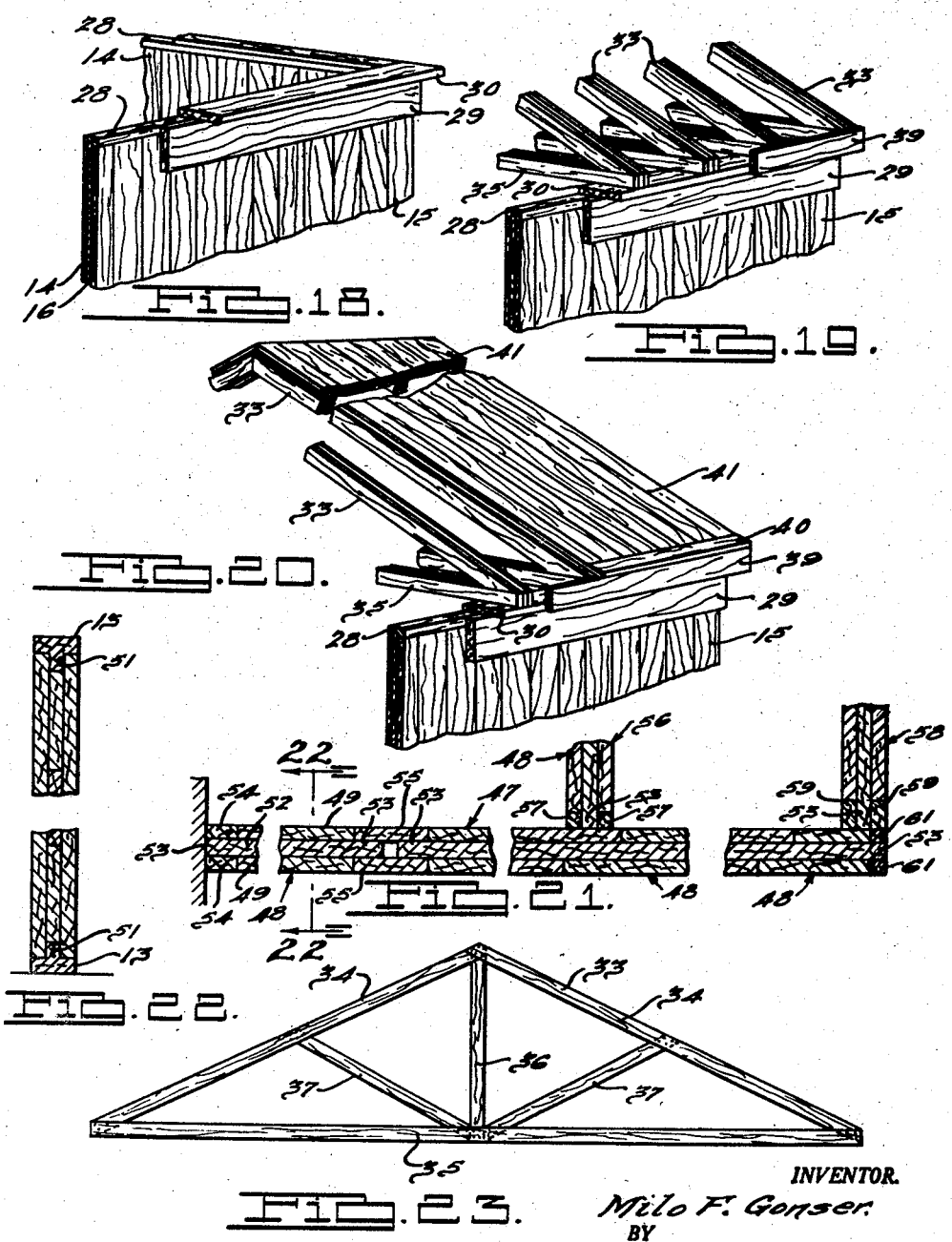

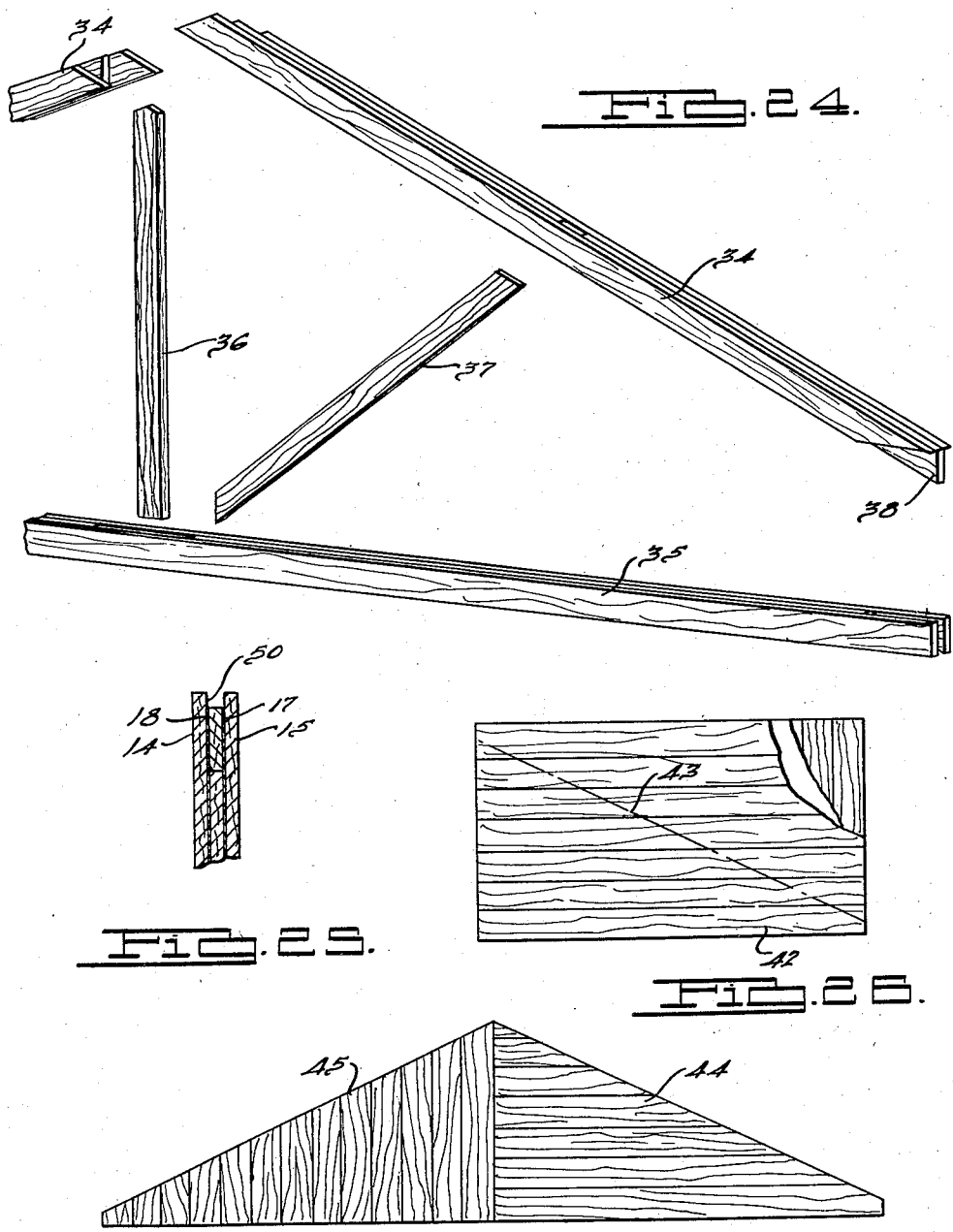

United States Patent Office 2,857,632
Patented Oct. 28, 1958

2,857,632

METHOD OF MAKING PANELS

Milo F. Gonser, Seney, Mich., assignor to Semico Incorporated, Seney, Mich., a corporation of Michigan Original application November 29, 1949, Serial No. 130,007. Divided and this application March 12, 1954, Serial No. 415,903

1 Claim. (Cl. 20—15)

This invention relates generally to prefabricated house constructions, and is a division of Serial No. 130,007, filed November 29, 1949, now abandoned. More particularly the invention relates to a prefabricated house construction in which the individual components which serve to make up the final structure are extremely simple in design and which may be accurately and precisely made with a minimum of equipment.

Still further, the invention relates to a prefabricated house structure in which the individual elements making up the completed construction are all constructed substantially entirely from wood.

A feature of the present invention resides in the provision of wall panel constructions which are not only of novel and improved form, but which are extremely simple to manufacture and which are provided with novel means on the lateral side edges thereof for mating one panel thereof with the next adjacent panel in order to provide a substantially continuous wall structure around the entire periphery of the building.

Still further, the present invention contemplates the provision of wall paneling structures, some of which may include doors, windows or other openings in which the panels are all provided with a tongue and groove arrangement at their upper and lower marginal edges in order to facilitate the mounting thereof in final position.

Still further, the invention contemplates the provision of a construction and arrangement of prefabricated parts which can be simply and conveniently erected by relatively unskilled labor and with a minimum of subsequent finishing operations, thereby greatly expediting the completion of the finished structure.

Many other and further objects, advantages and features will become clearly apparent from the following specification when considered in connection with the accompanying drawings forming a part thereof.

In the drawings:

Figure 1 is a perspective view of one form of prefabricated house structure constructed in accordance with the teachings of the present invention;

Fig. 2 is an enlarged vertical sectional view with portions broken away, illustrating the cross sectional configuration and arrangement of elements of a typical section through the side wall of the improved building structure shown in Fig. 1;

Fig. 3 is an enlarged cross sectional view taken substantially on the line 3—3 of Fig. 1, with portions broken away to illustrate in further detail the construction and arrangement of the side wall panels of the house with respect to the foundation and the mounting of the roof thereon;

Fig. 4 is an enlarged, fragmentary, sectional view taken on the line 4—4 of Fig. 1, illustrating in further detail the cross sectional construction of the wall panels and the manner in which the corner of the building structure is formed;

Fig. 5 is an enlarged, transverse, fragmentary cross sectional view taken substantially on the line 5—5 of Fig. 1, illustrating in further detail the construction and arrangement of the wall panels when permanently mounted in place;

Fig. 6 is a fragmentary cross sectional view of a modified form of corner construction;

Fig. 7 is a diagrammatic view of a typical floor plan of the building structure shown in Fig. 1;

Fig. 8 is a perspective view of the foundation structure on which the prefabricated housing construction of the present invention is adapted to be mounted;

Fig. 9 is an enlarged, fragmentary cross sectional view, taken substantially on the line 9—9 of Fig. 8, illustrating in detail the construction and arrangement of the upper portion of the foundation wall;

Fig. 10 is a fragmentary perspective view of a portion of the floor joist mounted in position, showing in detail the construction and arrangement of the floor supporting elements;

Fig. 11 is a fragmentary cross sectional view taken along the line 11—11 of Fig. 10, illustrating in detail the mounting and location of the floor supporting elements;

Fig. 12 is a fragmentary perspective view, similar to Fig. 10, showing the floor panels mounted in position on the floor supporting members;

Fig. 13 is a perspective view of a typical floor panel, a plurality of which are utilized for the purpose of making up the interior flooring of the housing structure;

Fig. 14 is a fragmentary perspective view, similar to Figs. 10 and 12, showing the wall supporting molding element mounted in position on the floor structure;

Fig. 15 is a fragmentary perspective view with portions broken away, similar to Figs. 10, 12 and 14, showing the manner in which the individual wall panels are mounted;

Fig. 16 is an enlarged perspective view of one of the typical wall panels which constitute an important part of the present invention;

Fig. 17 is a fragmentary sectional view with portions broken away, taken on the line 17—17 of Fig. 16, illustrating in detail the manner in which the several layers of the typical wall panels are offset from each other;

Fig. 18 is a fragmentary perspective view illustrating in detail the manner in which the upper marginal edges of the wall panels are anchored together in order to provide a complete unitary and integral construction;

Fig. 19 is a fragmentary perspective view, similar to Fig. 18, illustrating the manner in which the roof truss elements are mounted on the upper portion of the wall paneling structure, and in general, the manner in which the roof elements are assembled;

Fig. 20 is a fragmentary perspective view, similar to Figs. 18 and 19, illustrating the manner in which the roof panels are mounted on the roof truss elements;

Fig. 21 is a sectional view of an interior partition, illustrating the assembly of the panels thereof;

Fig. 22 is a sectional view of the interior partition, taken on the line 22—22 of Fig. 21;

Fig. 23 is an elevational view of a typical roof truss of the type shown in the preceding figures for supporting the roof panels;

Fig. 24 is an enlarged, fragmentary, exploded view of the various elements which together make up the roof truss elements shown in Fig. 23;

Fig. 25 is a view of structure illustrated in Fig. 17, showing another form thereof;

Fig. 26 is a plan view, with portions broken away, illustrating a section of wall paneling utilized for making the gable sections and the manner in which the same is cut to form a pair of gable sections; and Fig. 27 illustrates in elevation the manner in which the gable sections cut from the panel shown in Fig. 25 may be arranged to form a complete closure of the gable end of the prefabricated structure.

With more particular reference to the drawings, it will be readily apparent that while the improved building structure of the present invention has many and various novel features not heretofore disclosed, there are, however, a number of more or less conventional constructions and arrangements of parts which may very simply and conveniently be included for the purpose of providing an easily assembled and compact final product.

Referring now to Figs. 8 and 9 of the drawings, it will be readily appreciated that the foundation construction is more or less conventional in form and is illustrated herein merely for the purpose of providing a complete structure embodying the features of applicant's invention. This foundation construction may be formed of brick, reinforced concrete, or, as illustrated in Fig. 9, of conventional concrete blocks 1. This foundation merely constitutes a wall element defining the outer periphery of the housing structure to be erected and may include a central reinforcing wall 2 if the building is of such a size as to require additional support for the floor joists hereinafter described. This foundation construction is in all respects conventional in its form and erection and it is merely essential that it properly define the outline of the floor plan of the building to be completed, and be in all respects level on its upper surface. At the time the blocks making up the foundation are laid, suitable bolts 3 may be embedded in the concrete from which the foundation is formed, and these bolts may be employed for the purpose of anchoring thereto wooden base or plate members 5 which substantially cover and enclose the upper surface of the wall structure making up the foundation. After these plate members have been anchored in place, suitable wooden floor joists are utilized for constructing the floor supporting structure which, while being somewhat conventional in form, has unique features which render it particularly simple and easy of construction.

In the prefabrication of houses of this general character, it will be appreciated that a suitable supply of entirely pre-cut and pre-finished elements will be supplied for erecting the floor supporting structure. The number and dimension of these various elements will be determined by the precise sizes and configuration of the particular floor plan of the prefabricated house being constructed.

In the particular construction shown, a plurality of longitudinally extending wooden 2 x 8 joist members 6 are provided, cut properly to length so that they will extend substantially from one end of the floor structure to the other. Additional transversely extending 1 x 8 planking elements 7 are provided which, when anchored to the extreme outward end of the outermost of the joist members, will provide a continuous wall of planking extending upwardly from the foundation and of a size equal to the floor supporting structure and extending entirely around the outer periphery of the foundation. A sufficient supply of spacing elements 8 are all cut to size in order that the joist members making up the foundation may be equally spaced at the proper intervals and supported in the desirable vertical position, once they have been properly mounted in place.

These spacing members 8 may be directly nailed to the planking elements 7 which connect the two outermost joist members 6 and thus provide means for accurately locating and mounting the terminal ends of the intermediate joist members in the predetermined desired position. At suitable intervals throughout the length of the building structure, the joist members may have nailed thereto additional spacing members 8 in order that the intermediate portions of the joist members may be supported in the desired vertical position and maintained in properly spaced relationship in order to give the necessary rigidity to support the floor panels hereinafter described.

After completion of the floor supporting structure described above, a plurality of prefabricated floor panels, a typical example of which is shown in Fig. 13 of the drawings, are mounted upon this floor supporting structure.

These panels 9 are preferably supplied in standard sizes, such, for example, as four by eight feet, the dimensions of these panels being controlled so that a sufficient number of panels are supplied to wholly and completely cover the entire floor supporting structure with the marginal edges of these panels lying flush with the exterior surface of the joists and planking defining the periphery of the floor supporting structure. The mounting of these panels in predetermined position is shown in Fig. 12 of the drawings.

Each of these floor panels 9 is preferably composed of an upper layer 10 and a lower layer 11 of wooden boards, preferably having the boards of one layer running in a direction at right angles to the boards making up the other layer in order that the floor panel will be of maximum strength and rigidity. Interposed between the layers of boards 10 and 11 is a layer, or, if desired, a plurality of layers 12 of conventional insulating building paper or felt. After the boards making up the layers 10 and 11 are arranged in precise superimposed relation to each other with the insulating paper therebetween, this entire panel may be secured in permanently assembled relationship by nailing the boards of one layer to the boards of the other layer. The lower boards are preferably 1" thick, the top board one-half that, although the thickness may vary and be the same in the top and bottom boards.

This operation may be easily and conveniently performed by providing an assembly jig (not shown) having a steel base plate. The panels are four feet or multiples of 16" in width and variable lengths to meet the requirement of each structure. This jig may properly define the outer configuration of the floor panel to be assembled and the initial layer of boards 11 laid in the jig on the surface of the steel panel. Thereafter, a suitable section of building paper or felt is cut to size, inserted in the jig, and the second layer of boards mounted in the jig on top of the paper. This jig is preferably provided with means to locate the individual boards making up each of the layers in precisely the desired relation in order that the finally completed panel will have the external dimensions thereof accurately and precisely controlled. After these elements have been assembled in this jig, nails may be driven directly through the upper layers of boards, through the paper and through the lower layer of boards, the steel plate serving to clinch the nails on the lower side and lock the two layers in proper assembled relation as if riveted together.

These individual panels 9 are nailed to the floor supporting structure and it will be apparent that this entire floor and floor supporting structure may be completely assembled on the foundation in a minimum of time without skilled labor and without the necessity of utilizing any but a minimum of the most elementary tools and equipment.

The building has now reached the stage of completion where the entire floor supporting structure is mounted on the foundation and in which the entire floor supporting structure has covering, providing a level and continuous floor.

After completion of this stage of construction, sole plate elements 13 are nailed in place around the entire outer periphery of the floor structure and are nailed directly to the upper surface of the floor panels and preferably through to the floor supporting joist below or to plates in the concrete if a concrete floor is provided. These sole plates are all generally inverted T-shape in cross section and have a transverse width exactly equal to the transverse thickness of the wall panels described in detail below and shown in the perspective view, Fig. 17 of the drawings.

The wall panels which make up the entire wall structure of the present prefabricated housing construction are of rather unique form and play an important part in the provision of a wall structure which entirely eliminates the use of the conventional studding, but which at the same time has strength and thermal characteristics superior to many present conventional building structures.

These wall panels comprise the three separate layers of boards, that is, an inner layer 14, an outer layer 15 and an intermediate layer 16, and, as is clearly seen from Fig. 16 of the drawings, the grain of the boards making up the inner and outer layers runs in a vertical direction while the boards making up the intermediate layer run in a horizontal direction at substantially right angles to the boards of the inner and outer layers. In addition, suitable layers of building paper 17 and 18 are provided substantially coextensive with the layers of boards with which they are associated, one of these layers of insulating building paper being provided between the inner layer of boards and the intermediate layer of boards, and the other located between the outer layer of boards and the intermediate layer of boards substantially in the relationship illustrated in Fig. 17 of the drawings. These three layers of boards which make up the individual wall panels may be assembled in a manner generally similar to that described in connection with the assembly of the floor panel elements 9 referred to above. The particular jig required for the assembly of these wall panels, however, is necessarily one which will provide the layers with the precise desired amount of relative offset therebetween as hereinafter described.

As is clearly seen by reference to Figs. 16 and 17 of the drawings, the intermediate panel 16 is vertically offset with respect to the inner and outer panels 14 and 15, the magnitude of this offset being substantially equal to the thickness of one of the layers of boards making up the panel and in this connection attention is drawn to the fact that each of the layers 14, 15 and 16 is substantially identical in width, length and thickness. Consequently, this vertical offset above described allows the intermediate panel to protrude an amount about equal to its thickness above the upper marginal edges of the panels 14 and 15, thus providing a tongue structure throughout the upper marginal edge of the completed panel. Similarly, this offset results in the inner and outer panels extending below the lower marginal edge of the intermediate panel 16, thus providing a groove structure generally designated 19 throughout the lower marginal edge of the completed panel. In addition to this vertical offset above described, the inner panel 14 is offset laterally with respect to the intermediate panel in one direction and the outer panel is similarly offset laterally in the opposite direction from the intermediate panel, thus providing a generally stepped formation in each of the lateral marginal edges of the panel. The magnitude of these two last mentioned offsets is substantially equal to double the thickness of one of the layers of the completed panel so that when adjacent panels are mounted with their lateral marginal edges together, a joint therebetween will be formed substantially as shown at 20 in Fig. 4 of the drawings.

It is apparent that these panels may be easily fabricated and completed at the lumber mill where the prefabricated parts of the housing structure are constructed, and that all panels may be constructed of identical vertical height. However, various of the panels may be made in different lateral dimensions to facilitate the location of the various doors and windows in the finally completed housing structure and at the same time to permit a reasonable amount of variation in the door and window arrangements in a particular housing structure. For example, these panels may be conveniently formed in widths of 2, 3, 4 and 6 feet in order that the maximum amount of variation in the final wall structure may be obtained with a minimum number of panel types. Certain of the panels may include window frames 21 therein which at the time the panels are prefabricated will merely include a planking element of a width equivalent to the thickness of the panel, completely surrounding a window opening of the predetermined desired size and shape. Similar door openings may be provided in these prefabricated panel sections in order that a specific house plan may conveniently be assembled from completely prefabricated parts.

The panels which join at any one corner of the house may, if desired, be prefabricated in a manner slightly different from that described above in that in these panels the magnitude of the offsets at the marginal edge thereof is reduced to half the amount previously described, whereby two adjacent wall panels may be fitted together to provide a joint substantially such as that shown at 22 in Fig. 4. If, however, it is desired to use wall panels having a construction such as that shown in Fig. 16 of the drawings throughout the house construction, these panels may be supplied with filler strips 23 and 24 which, when applied to the panels, will result in a joint substantially similar to that shown at 25 in the modification illustrated in Fig. 6 of the drawings. The strips have paper attached to the inner face by staples, adhesive, tacks or other means.

Inasmuch each of the individual wall panels making up the housing structure is provided with a generally grooved lower marginal edge, it will be seen by reference to Fig. 2 that these panels may be easily and conveniently mounted on the sole plate 13 to provide a tight seal between the lower marginal edge of the wall panels and the floor structure. The sole plate 13, as has been described above, is generally of inverted T-shape in cross section and is provided with a tongue 26 adapted to mate with the groove 19 of the lower marginal edge of each of the panels. It is thus appreciated that these wall panels may be arranged to form a substantially continuous accurately located wall around the entire periphery of the floor structure, which wall will be mated thereto by means of a substantially weathertight joint and that the various panels making up this wall may be selected of such predetermined width and type so that the various window and door openings desired by the particular customer may be arranged at the desired location around the building.

The upper marginal edges of these wall panels will inherently result in the formation of a continuous tongue element 27 extending around the entire periphery of the upper edge of the wall structure. A cap plate 28 of generally inverted U-shape in form, having a recess therein adapted to receive the tongue 27 and having side walls adapted to abut against the upper ends of the inner and outer panels 14 and 15 may be nailed to these wall panels, as is clearly shown in Fig. 2 of the drawings. The side walls of this cap plate member 28 will lie flush with the inner and outer surface of the wall panels to provide a relatively smooth external surface at this point and will align the panels at the top.

A relatively heavy planking member 29, preferably a two by ten or two by twelve, is then secured to the cap plate 28 and the outer surface of the wall panels, which planking member may be provided in suitable pre-cut lengths in order to extend as a substantially continuous supporting element around the entire periphery of the building with its upper marginal edge lying flush with the base of the cap plate 28, as is clearly seen in Figs. 2 and 3. Along the front and rear walls of the building, a plate element 30 is nailed to the cap plate 28 and planking 29 and extends outwardly therefrom to provide the necessary overhanging or gable for the roof structure hereinafter described below. The band of planking 29 serves to provide additional functions which are important to the rigidity of the building construction. By reference to Fig. 2 it will be seen that the elements 21 which define the window openings lie with their side walls flush with the inner and outer walls of the wall panel in which they are mounted. Suitable prefabricated window frames, generally designated at 31, may be provided which freely fit into these openings and, as will be noted from Fig. 2 of the drawings, the upper portion of the window frame 31 lies flush with the exterior surface of the wall panels in which the window frames are mounted. These window frame elements do, however, have the side trim strip 32 attached thereto protruding laterally a substantial amount beyond the edge of the window opening in which the windows are mounted. The side trim strips 32 terminate at their upper end at a point where they will directly engage and abut the lower marginal edge of the adjacent planking element 29, thus firmly locating and squaring the window frame in position within the window opening.

This construction serves not only to provide an accurate and precise mounting for the window frame, but serves to provide additional rigidity and support for the panel in which the window frame is mounted and serves to provide a precise means for locating the window frame in its predetermined finally desired position. All of the window frames and door frames are completely prefabricated at the factory in substantially finally finished condition and inserted in the openings provided in the various wall panels in order that these windows and doors may be mounted in the building structure with a minimum of time, effort, and the work may obviously be done by relatively unskilled labor.

In order to assemble the roof structure on the improved building construction described above, it will be seen that the plate element 30 is mounted in position on opposite sides of the building in the manner above described. This plate element 30 serves to support a plurality of roof trusses, generally designated 33, shown in elevation in Fig. 23 of the drawings.

Each of these roof trusses is constructed in the manner shown in Fig. 24 of the drawings, that is, they comprise two rafter elements 34, each of which is composed of a three layer thickness of boards. The truss also includes a ceiling joist 35 similarly composed of three layers of boards together with a main central strut brace 36 and side strut braces 37 of single board construction. As will be seen by reference to Fig. 24, the end of the intermediate board member of the ceiling joist is cut off at an angle short of the ends of the outer element to provide a recess adapted to receive the protruding tongue 38 formed on the lower end of the element 34, which tongue is formed by cutting off at an angle the outer ends of the two outer boards which make up the element 34. Similarly, the various strut braces 36 and 37 have the ends cut off to mate with the rafter elements and the ceiling joist. The strut brace 36 is positioned vertically at the ridge point and the strut braces 37 extend from each rafter mid-span to the ceiling joist abutting the sides of the strut brace 36. It will be clearly apparent from a consideration of the construction described that each of these individual truss elements may be completely assembled and secured in the form shown in Fig. 21 in a relatively short time on the site. These individual truss elements span the entire transverse width of the building and rest on the plate element 30, as shown in Fig. 20.

After all of these elements have been mounted in position, a 1 x 6 planking element 39 is nailed to the outer marginal edge of the plate member 30 and also nailed to each of the truss elements described above. This planking element 39 may have spacers 8 applied thereto to precisely locate the ends of each of the truss elements in predetermined assembled condition in the spaces therebetween. The ends of the truss elements support a filler and drip strip 40 shown in Fig. 20, which strip runs throughout the entire length of the building on each side thereof and serves to continue the lower marginal edge of roof panels 41 which may be formed substantially similar in construction to the floor panels described above and which may be supplied in standard sizes and shapes so that they may be utilized to completely cover the entire roof truss structure. The panels 41 are mitered at the ridge point to form a vertical abutting joint and are four feet or multiples of sixteen inches in width and variable lengths to meet the requirements of each building.

A single large panel 42 may be fabricated in much the same manner as the roof panels described above, to form the two gable panels. This large panel, after being fabricated with the necessary building paper between the two layers, may be sawed along the line 43 to form two panels 44 and 45, which, when arranged in the manner shown in Fig. 24, may be utilized to enclose the gable end walls of the building structure, these panels precisely fitting in the space provided for them. After completion of the building structure in the manner described above, the entire outer wall surface may be additionally covered with any type of finishing material, and by way of example paneling 46 is illustrated applied in the manner shown in Fig. 5 running in a vertical direction, but it is to be understood that the paneling may run in a horizontal direction. Brick, stucco and similar facing materials may also be employed. Similarly, the roof may be covered with shingles, roofing paper, or other similar material. A drip cup 46 is applied to the top of the planking elements 29, as illustrated in Fig. 2.

Referring to Fig. 7, partitions 47 are illustrated for dividing the floor space within the building. The elements of the partition are made of the same material and substantially in the same manner as the side panels above referred to, with slight modifications.

Referring to Figs. 21 and 22, a partition 47 is illustrated, made up of panels 48, each consisting of two outer layers of boards 49 the grain of which runs in a vertical direction and an inner layer of boards 52 disposed therebetween with the grain running horizontally at right angles to the boards 49. Jigs are provided for accurately locating the boards on a steel plate, after which they are nailed together on the plate which clinches the nails in rivetlike position for holding the boards to make a three-ply panel. The boards are selected of such dimension and the jig is so constructed as to have the assembly of the inner boards 52 of less height than the inner and outer boards 49, thereby providing a groove 51 both at the top and at the bottom of the panel. It might be noted at this point, as mentioned above, that the outer panels may be constructed in the same manner by having a groove 51 in the top edge thereof instead of the tongue 18. When top grooves are utilized, the sole plates 13 may be employed at the top the same as at the bottom. This plate 13 is employed for aligning and strengthening the top of the partition panels 47.

The partition panels 47 are constructed in a modulus of widths, preferably 5", 7", 11", 13", 16", 2 ft. and 4 ft., with a tongue 53 along each side which is approximately 2" long. With such a modulus of widths, all partitions may be assembled on the site, with the necessity only of sawing the tongue to have the partition accurately fit in between two walls. It will be noted in Fig. 21 that the tongue 53 adjoining the left-hand wall of the building has filler strips 54 added on each side thereof to complete the thickness of the panel adjacent to the wall. The left-hand end of the second panel 48 has its tongue 53 spaced from the tongue 53 of the panel 48 adjacent to the wall by the filler strips 55. The joint is substantially strengthened by the nailing of the filler strips to the tongues.

A partition 56 at right angles to the partition 47 is also illustrated in the figure. The length of the tongue 53 was reduced by ripping a portion therefrom so that the assembly of panels 48 would fit between the partition 47 and the wall. Filler strips 57 are nailed to the remaining portion of the tongue 53 to continue the outside layers of the panels to the partition 48. Nails are then driven through the partition 48 into the abutting edge of the partition 56 to retain the partition in position. Similarly, the end partition 58 has filler strips 59 applied to the tongue 53 to provide a butt end to the end panel of the partitions 58. The tongue 53 of the right-hand panel 48 in a like manner has been ripped to correct length and has filler strips 61 nailed thereto. Nails or spikes are then driven through the right-hand panel 48 into the butt end of the panel 58. By having various widths of panels 48 and by treating the tongue 53 in the manner illustrated, that by spacing the tongue or ripping the tongue to produce the proper lengths, and by employing filler strips, any length of partition may be assembled within the building.

Plaster over wood on metal lathe or rock board may be employed to finish the surface of the panels, or suitable trim board may be applied directly thereto for finishing the walls. The same finish boards or ceiling boards or plaster may be applied to the rafters 35 in the conventional manner. A chimney may be added to the building which may be of the prefabricated type supported on the ceiling joists 35 or from the ground, or a brick or block chimney of conventional form may be utilized in the conventional manner either on the interior or exterior of the building. The chimney may be of the multiple flue type so that it may also service a fireplace which may be added by cutting a portion of the wall panel away sufficient to provide the fireplace opening.

The surface of the interior layer of the boards may be broken by a channel 63 which is routed therein and in which a pair of insulated wires of a form to pass the electrical code may be laid for sealing the wires from above the ceiling which drop downwardly to baseboard or wall outlets and to switches located adjacent to the doors. The receptacle box may be located any place along the slot at a desirable height above the floor by cutting an opening into the wall panel of a depth to receive the box in which the switch or outlet is supported. The slots conceal the wire on the inner surface of the building, eliminating the use of expensive and unsightly conduits and substantially reduce the cost for installing the wiring, switches and outlets within the building.

Referring to Fig. 25, it will be noted that the panels forming the sides of the building may have a slot 50 provided centrally along the top edge in place of the tongue 18, in which case the sole plate 13 is employed in inverted arrangement as the cap plate, as pointed out hereinabove.

From the foregoing it will be seen that the building structure described above is not only one which can be most easily and conveniently assembled to form a finished housing structure, but one which is made up of elements which may be very simply and cheaply prefabricated at the point of manufacture. It is also obvious that the interior partitioning of the building structure may be prefabricated at the point of manufacture in such modulus of widths that any length or type of partitions may be assembled within the building on the site.

It will be apparent that the structure described above is merely illustrative of one embodiment of the invention which may be constructed in accordance with the teachings of the present invention and that other, further and various embodiments of the inventive ideas hereinbefore disclosed may be made without departing from the spirit and scope of the invention defined in the following claim.

What is claimed is:

The method of making a three ply wall panel having tongue and grooved opposite edges, which includes the steps of, providing a jig assembly to define the edges of said panel, positioning a plurality of boards within said jig to form a layer having the edges thereof defined by said jig, placing a sheet of building paper over said layer, positioning a plurality of boards within said jig to form a second layer having the edges thereof defined by said jig in offset relation with the first layer, placing a sheet of building paper over the second layer, positioning a plurality of boards within said jig to form a third layer having the edges thereof defined by said jig in offset relation with the second layer, joining the three layers firmly together to form one three ply wall panel, and removing the jig from the edges of the panel.

References Cited in the file of this patent

UNITED STATES PATENTS

| | | |
|---|---|---|
| 187,502 | Banker | Feb. 20, 1877 |
| 304,531 | Lee | Sept. 2, 1884 |
| 471,944 | Brunham et al. | Mar. 29, 1892 |
| 1,375,402 | McAvoy et al. | Apr. 19, 1921 |
| 1,660,480 | Daniels | Feb. 28, 1928 |
| 1,779,325 | Manning | Oct. 21, 1930 |
| 2,295,248 | Wittner | Sept. 8, 1942 |
| 2,629,139 | Thelander | Feb. 24, 1953 |

FOREIGN PATENTS

| | | |
|---|---|---|
| 179,990 | Switzerland | Apr. 10, 1935 |